United States Patent [19]

Itakura et al.

[11] Patent Number: 5,883,863
[45] Date of Patent: Mar. 16, 1999

[54] MAGNETO-OPTICAL READING METHOD AND APPARATUS AND MAGNETO-OPTICAL RECORDING MEDIUM USED FOR EXECUTION OF THE METHOD

[75] Inventors: Akihiro Itakura; Masakazu Taguchi, both of Kawasaki, Japan

[73] Assignee: Fujitsu Limited, Kawasaki, Japan

[21] Appl. No.: 918,773

[22] Filed: Aug. 25, 1997

[30]     Foreign Application Priority Data

Mar. 25, 1997  [JP]  Japan ................................. 9-072455

[51] Int. Cl.$^6$ ..................................................... G11B 11/00
[52] U.S. Cl. ............................................. 369/13; 369/110
[58] Field of Search .......................... 369/13, 110, 116, 369/14, 59; 300/59, 114; 365/122; 428/694 ML

[56]                  References Cited

U.S. PATENT DOCUMENTS

| 4,998,231 | 3/1991 | Watanabe et al. ........................ 369/13 |
| 5,122,414 | 6/1992 | Shimizu et al. ......................... 428/323 |
| 5,450,381 | 9/1995 | Tsukamura et al. ...................... 369/13 |
| 5,533,003 | 7/1996 | Kobayashi ............................ 369/275.4 |
| 5,615,193 | 3/1997 | Kobayazhi et al. ....................... 369/59 |

FOREIGN PATENT DOCUMENTS

| 1144041 | 6/1989 | Japan . |
| 393058 | 4/1991 | Japan . |
| 4366426 | 12/1992 | Japan . |
| 676399 | 3/1994 | Japan . |
| 7244877 | 9/1995 | Japan . |

*Primary Examiner*—Tan Dinh
*Attorney, Agent, or Firm*—Greer, Burns, & Crain, Ltd.

[57]                  ABSTRACT

To provide a magneto-optical reading method of making the inclinations of the front and rear edges of a waveform of a reading signal formed on a magneto-optical recording medium to be read more symmetric by applying a reading magnetic field different in accordance with the direction of a recording magnetic field when reading the recording marks to which recording magnetic fields in different directions are applied for recording because the present ranges of the front and rear edges are previously determined.

9 Claims, 7 Drawing Sheets

MAGNETO-OPTICAL READING METHOD AND APPARATUS AND MAGNETO-OPTICAL RECORDING MEDIUM USED FOR EXECUTION OF THE METHOD

BACKGROUND OF THE INVENTION

The present invention relates to a magneto-optical recording medium reading method and an apparatus and a magneto-optical recording medium used for execution of the method, particularly to a magneto-optical recording medium, a method, and an apparatus realizing the MSR (Magnetically Induced Super Resolution) reading.

It is requested to further increase the recording capacity of a magneto-optical disk. To improve the recording density, it is necessary to form more recording marks on a medium and thus, it is necessary to make the recording mark length smaller than the spot diameter of a laser beam and shorten an interval between the recording marks. The recording density of recording marks for magneto-optical recording or reading is restricted by the spot diameter of a light beam irradiated to a disk. It is relatively easy to form very small recording marks having a cycle equal to or less than a spot diameter. However, it is difficult to read very small recording marks exceeding the resolution of an optical system.

Therefore, an MSR reading method and an MSR medium producing the same effect as the case of decreasing a spot diameter by using the temperature distribution of a medium produced in the spot of a light beam and thereby reading recording marks out of some regions in the spot are disclosed in the Japanese Patent Application Laid-Open Nos. 1-143041 (1989) and 3-93058 (1991). The former is a magneto-optical reading method of emitting a light beam while applying a reading magnetic field to a magneto-optical disk having a multilayer structure obtained by superposing a reading layer, switching layer, and recording layer on a substrate. A temperature distribution is produced in the beam spot due to rotation of the magneto-optical disk at the time of reading and a high-temperature region and a low-temperature region are formed. In the low-temperature region, recording marks on the recording layer are transferred to the reading layer due to the exchange coupled force between the recording layer and the reading layer through the switching layer and read out. In the high-temperature region, because the exchange coupled force between the recording layer and the reading layer is lost, magnetization of the reading layer is arranged in the direction of a reading magnetic field and the recording marks on the recording layer are masked. Thereby, the recording marks are read only from the low-temperature region in the spot (FAD system) and the read resolution is improved substantially similarly to the case of focussing the beam spot.

The MSR medium disclosed in the latter Japanese Patent Application Laid-Open No. 3-93058 (1991) uses a magneto-optical reading method of emitting a light beam while applying an initial magnetic field and a reading magnetic field to a magneto-optical disk having a multilayer structure obtained by superposing a reading layer, auxiliary reading layer, intermediate layer, and recording layer on a substrate. A temperature distribution is produced in a beam spot S due to rotation of the magneto-optical disk at the time of reading. In a low-temperature region, magnetization of the reading layer is arranged in the direction of an initialization magnetic field and recording marks of the recording layer are masked (front mask). In a high-temperature region, magnetization of the reading layer is arranged in the direction of a reading magnetic field and recording marks of the recording layer are masked (rear mask). In a middle-temperature region, the recording marks of the recording layer are transferred to the reading layer through the intermediate layer and the auxiliary reading layer and read out (aperture portion). Thereby, the recording marks are read only from the middle-temperature region in the beam spot and the read resolution is improved substantially similarly to the case of focussing the beam spot (RAD double mask system).

In the case of the MSR reading system disclosed in the Japanese Patent Application Laid-Open No. 3-93058 (1991), it is necessary to arrange the magnetization of the reading layer and that of the auxiliary reading layer in the same direction by applying an initialization magnetic field with thousands of Oe by an initialization magnet. This is because the coercive force between the reading layer and the auxiliary reading layer is larger than the exchange coupled force from the recording layer through the intermediate layer.

To solve the above problem, the applicant of the present invention proposes a magneto-optical recording medium for realizing MSR reading by the RAD double mask system by applying a low reading magnetic field with hundreds of Oe without using an initialization magnet in the Japanese Patent Application Laid-Open No. 7-244877 (1995). FIGS. 1A and 1B are illustrations showing a magnetized state when reading an MSR medium proposed by the applicant of the present invention together with a film structure, in which FIG. 1A shows a magnetized state when applying a reading magnetic field in the direction opposite to the recording direction of recording marks and FIG. 1B shows a magnetized state when applying a reading magnetic field in the same direction as the recording direction of them. In FIGS. 1A and 1B, the substrate and protective layer of the medium are omitted.

As shown in FIGS. 1A and 1B, a magneto-optical disk 1 is constituted by superposing a reading layer 33, an intermediate layer 34, and a recording layer 35 on a substrate (not illustrated) in order. The reading layer 33 is a transition-metal magnetization dominant film and has a magnetization easy axis in the perpendicular direction or the superposing direction. The intermediate layer 34 is a rare-earth magnetization dominant film and has a magnetization easy axis in the in-plane direction at room temperature (10° to 35° C.). When the layer 34 has a predetermined temperature higher than room temperature or higher, the direction of the magnetization easy axis changes from the inward to perpendicular directions. The recording layer 35 is a transition-metal magnetization dominant film and has a magnetization easy axis in the perpendicular direction.

To form recording marks on the magneto-optical disk 1 having the above structure, a recording laser beam is emitted while applying a recording magnetic field. Information is recorded by assuming upward as the recording direction to explain the magnetized state of the magneto-optical disk 1 at the time of reading. As shown in FIG. 1A, when a reading laser beam is emitted to the magneto-optical disk 1 and a downward reading magnetic field (negative magnetic field) opposite to the recording direction is applied, the exchange coupled force between the intermediate layer 34 and the recording layer 35 is weak in a low-temperature region at the front side of the laser beam and magnetization of the intermediate layer 34 is arranged in the direction of the reading magnetic field, that is, downward. Then, the magnetized direction of the reading layer 33 is arranged upward due to the exchange coupled force between the intermediate layer 34 and the reading layer 33 to mask the magnetized direction of the recording layer 35 (front mask). Moreover, a high-temperature region is a region in which the temperature exceeds the Curie temperature of the intermediate layer 34, in which the exchange coupled force between the intermediate layer 34 and the reading layer 33 is lost. Thereby, the magnetized direction of the reading layer 33 is arranged in the downward direction of a reading magnetic field to mask the magnetized direction of the recording layer 35 (rear mask). In the middle-temperature region between the low- and high-temperature regions, the magnetized direction of the recording layer 35 is transferred to the reading layer 33 through the intermediate layer 34 (aperture portion) due to the exchange coupled force between the recording layer 35 and the reading layer 33.

Moreover, as shown in FIG. 1B, when a reading laser beam is emitted to the magneto-optical disk 1 and an upward reading magnetic field (positive magnetic field) opposite to that in FIG. 1A is applied to an irradiation region, the exchange coupled force between the intermediate layer 34 and the recording layer 35 is weak in the low-temperature region and the magnetization of the intermediate layer 34 is arranged in the direction of the reading magnetic field, that is, upward. Moreover, the magnetized direction of the reading layer 33 is arranged downward by the exchange coupled force between the intermediate layer 34 and the reading layer 33 to mask the magnetized direction of the recording layer 35 (front mask). Furthermore, the high-temperature region is a region in which the temperature exceeds the Curie temperature of the intermediate layer 34, in which the exchange coupled force between the intermediate layer 34 and the reading layer 33 is lost. Thereby, the magnetized direction of the reading layer 33 is arranged in the upward direction of the reading magnetic field to mask the magnetized direction of the recording layer 35 (rear mask). In the middle-temperature region between the high- and low-temperature regions, the magnetized direction of the recording layer 35 is transferred to the reading layer 33 (aperture portion) through the intermediate layer 34 due to the exchange coupled force between the recording layer 35 and the reading layer 33 through the intermediate layer 34. Thus, in the case of an MSR medium of the applicant of the present invention, because the magnetized direction of the intermediate layer 34 can be arranged in the direction of the reading magnetic field with hundreds of Oe, it is possible to form a front mask without using an initial magnet with thousands of Oe.

In the case of the above-described MSR medium obtained by forming a mask in the beam spot S, the mask forming range in the beam spot slightly differs depending on the direction of a magnetic field applied for reading. It is found that the inclinations of the front and rear edges of the waveform of a reading signal (reading waveform) are different from each other due to the difference in the mask forming range. FIG. 2 is an illustration showing the recording marks formed on the magneto-optical disk 1 and the waveforms of reading signals obtained by applying reading magnetic fields of negative and positive magnetic fields, which are measured by the applicant of the present invention. The recording marks whose magnetized direction is the same as that of the recording direction are shown by hatching them.

In the case of the reading waveform, the inclination of the front edge is moderate compared to that of the rear edge when reading the MSR medium by applying a negative magnetic field to the medium but the inclination of the rear edge is moderate compared to that of the front edge when reading the MSR medium by applying a positive magnetic field to the medium as shown in FIG. 2. Thus, it is found that the reading waveform has nonlinearity in either case. The front edge of the reading signal becomes steeper by applying a positive magnetic field because the magnetized direction of the intermediate layer 34 at the aperture portion is the same as the direction of the reading magnetic field at the point of time of reading the recording marks of the recording direction when applying the negative magnetic field but it is opposite to the direction of the reading magnetic field when applying the positive magnetic field (see FIGS. 1A and 1B) and thereby, the front mask is formed up to a position closer to the center of the beam spot S by applying the positive magnetic field compared to the case of applying the negative magnetic field. Moreover, the rear edge of the reading signal becomes steeper by applying the negative magnetic field because the magnetized direction of the reading layer 33 becomes the same as the magnetized direction of the intermediate layer 34 at the aperture portion at the point of time of reading recording marks when applying the negative magnetic field but it becomes opposite when applying the positive magnetic field (see FIGS. 1A and 1B) and thereby, the rear mask is formed up to a position closer to the center of the beam spot S by applying the negative magnetic field compared to the case of applying the positive magnetic field.

The inclination of the reading waveform influences jitter. As the inclination of an edge becomes moderate, the jitter increases. As described above, when the reading waveform has nonlinearity, there is a problem that the jitter of either-side edge increases and greatly influences reading characteristics. Moreover, as the recording density rises, the jitters of front and rear edges increase. In the case of a high-recording-density medium such as an MSR medium, there is a problem that a reading signal with asymmetric edges is greatly deteriorated in quality.

To solve the problem, the applicant of the present invention proposes a method of detecting the timing of an edge of a produced waveform in accordance with an obtained reading signal and reversing a reading magnetic field after detecting the edge. According to this reading method, it is possible to apply a positive magnetic field when the front edge of a recording mark is generated and a negative magnetic field when the rear edge of the mark is output and moreover, making the both edges of the reading waveform more symmetric. However, when considering the circuit delay of a signal processing circuit and the time required for reversal of a magnetic field, there is a problem that reversal of the magnetic field may not be completed before the next edge is read in the case of magnetic field modulation on the basis of the detection result of a reading signal when very small recording marks are formed at short edge intervals.

BRIEF SUMMARY OF THE INVENTION

The present invention is made to solve the above problems and one object of the present invention is to provide a magneto-optical reading method and an apparatus used for execution of the method capable of securely applying reading magnetic fields with different polarities in outputting the front edge and the rear edge of a recording mark by applying a reading magnetic field to be reversed synchronously with the reversal cycle of a recording magnetic field applied for recording when reading a magneto-optical disk in which the present range of the front and rear edges of the recording mark is previously determined and obtaining a high-quality reading signal by making the inclination of the both edges closer to symmetric. Moreover, it is another object of the present invention to provide a magneto-optical recording medium which is an MSR medium whose reading waveform has nonlinearity and in which recording marks whose shift amounts are different in accordance with data to be recorded.

A magneto-optical reading method of the present invention comprises the steps of detecting the reversal cycle of the recording magnetic field of a magneto-optical recording medium, applying a reading magnetic field whose timing of reverse between first and second polarities synchronizes with the timing of reverse of the recording magnetic field to the magneto-optical recording medium so that the reverse of polarities occurs in the same cycle as that of the recording magnetic field, and detecting the magneto-optical reading signal of the recording marks to read the data.

Moreover, a magneto-optical reading method of the present invention comprises the steps of applying a reading magnetic field of different polarities according to the front edge and the rear edge of the recording marks to a magneto-optical recording medium, and detecting the magneto-optical reading signal of the recording mark to read the data.

Furthermore, in the case of a magneto-optical reading method of the present invention, the step of applying the reading magnetic field includes the steps of applying the reading magnetic field with the first polarity when reading a recording mark formed by applying the first polarity of the recording magnetic field and applying the reading magnetic field with the second polarity when reading a recording mark formed by applying the second polarity of the recording magnetic field.

Furthermore, in the case of a magneto-optical reading method of the present invention, the step of applying the reading magnetic field includes the steps of applying the reading magnetic field with the second polarity when reading a recording mark formed by applying the first polarity of the recording magnetic field and applying the reading magnetic field with the first polarity when reading a recording mark formed by applying the second polarity of the recording magnetic field.

Therefore, in the case of a magneto-optical recording medium in which data is recorded through recording marks with different shift amounts from a predetermined position, because the front and rear edges of a recording mark are formed without fail while positive and negative recording magnetic fields are applied, it is possible to apply a reading magnetic field by detecting the reversal cycle of the polarity of a recording magnetic field applied for recording, that is, obtaining the reference clock and thereby, reversing the polarity of the recording magnetic field at the same timing as the reversal cycle of the recording magnetic field. Thus, it is possible to apply a reading magnetic field with a polarity capable of making the inclination of the edge of a reading waveform steep at the front and rear edges of a recording mark and obtain a reading waveform having linearity.

A magneto-optical reading apparatus of the present invention comprises an optical head for emitting a light beam to obtain reading signals of a prepit and a recording mark on a magneto-optical recording medium, a circuit for generating a reference clock from the reading signal of the prepit, a circuit for generating a magnetic field modulation signal for reversing the polarity of a reading magnetic field on the basis of the reference clock, a magnetic head for applying the reading magnetic field to the magneto-optical recording medium, and a circuit for comparing the reading signal of the recording marks with a predetermined sawtooth-wave signal and detecting the shift amounts of the recording marks in accordance with a comparison result so as to read the data.

A magneto-optical reading apparatus of the present invention comprises an optical head for emitting a light beam to obtain reading signals of a prepit and a recording mark on a magneto-optical recording medium, a circuit for generating a reference clock from the reading signal of the prepit, a circuit for generating a magnetic field modulation signal for reversing the polarity of a recording magnetic field and a reading magnetic field on the basis of the reference clock, a circuit for indicating the phase of a light beam to the optical head in accordance with data to be recorded for recording, and a circuit for comparing the reading signal of the recording marks obtained from the optical head with a predetermined sawtooth-wave signal by a comparison, detecting the shift amount of the recording marks to read the data, for reading.

Therefore, because a prepit is read to generate a reference clock and a reading magnetic field is reversed on the basis of the reference clock, it is possible to reverse the polarity of the reading magnetic field at the same timing as that of a recording magnetic field reversed on the basis of the reference clock.

A magneto-optical recording medium of the present invention comprises a substrate and a magnetic layer constituted by superposing magnetically-connected first magnetic layer, second magnetic layer, and third magnetic layer in order on the substrate, in which the magnetic layer has a temperature distribution region where a temperature distribution is produced due to emission of a light beam moving relatively to the magneto-optical recording medium, the temperature distribution region having recording marks, in a region specified due to temperature, whose shift amounts from a predetermined position to differ in accordance with data to be recorded and which are formed by irradiating a light beam at different timings while applying a recording magnetic field with a polarity reversed on a predetermined cycle are included.

Therefore, a reading signal of a magneto-optical recording medium allowing MSR reading has a steep edge compared to the case of a magneto-optical recording medium to be usually read and has a small binary-signal jitter to the same noise power. Therefore, it is possible to obtain a reading characteristic with a small jitter from a medium allowing high-density recording.

The above and further objects and features of the invention will more fully be apparent from the following detailed description with accompanying drawings.

DETAILED DESCRIPTION OF THE INVENTION

Figure 1A:
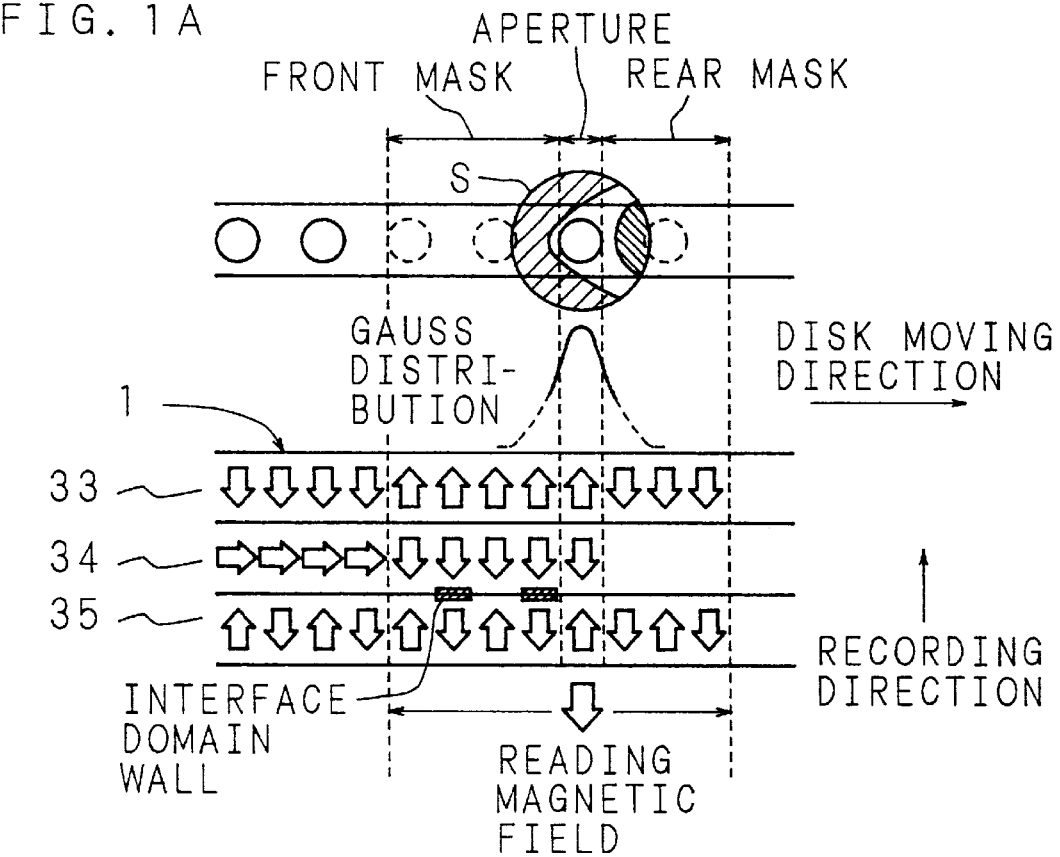
FIGS. 1A and 1B are illustrations showing the magnetized state of an MSR medium when reading the medium proposed by the applicant of the present invention.
Figure 1B:
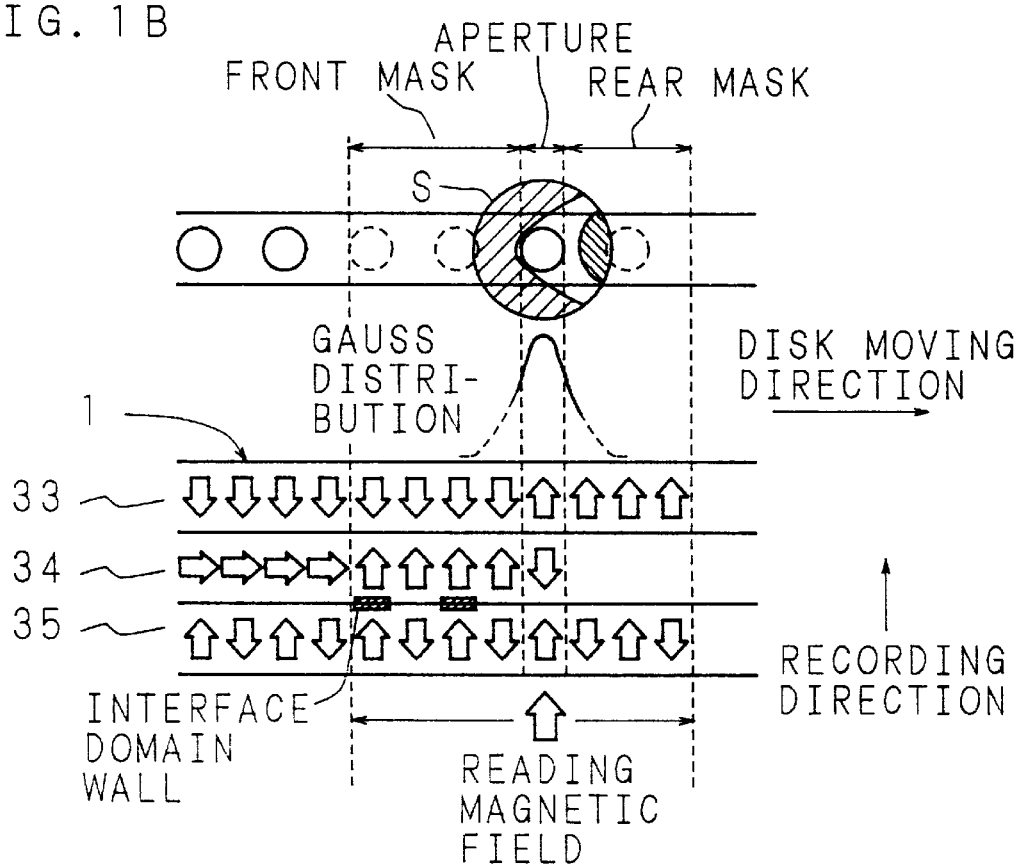
Figure 2:
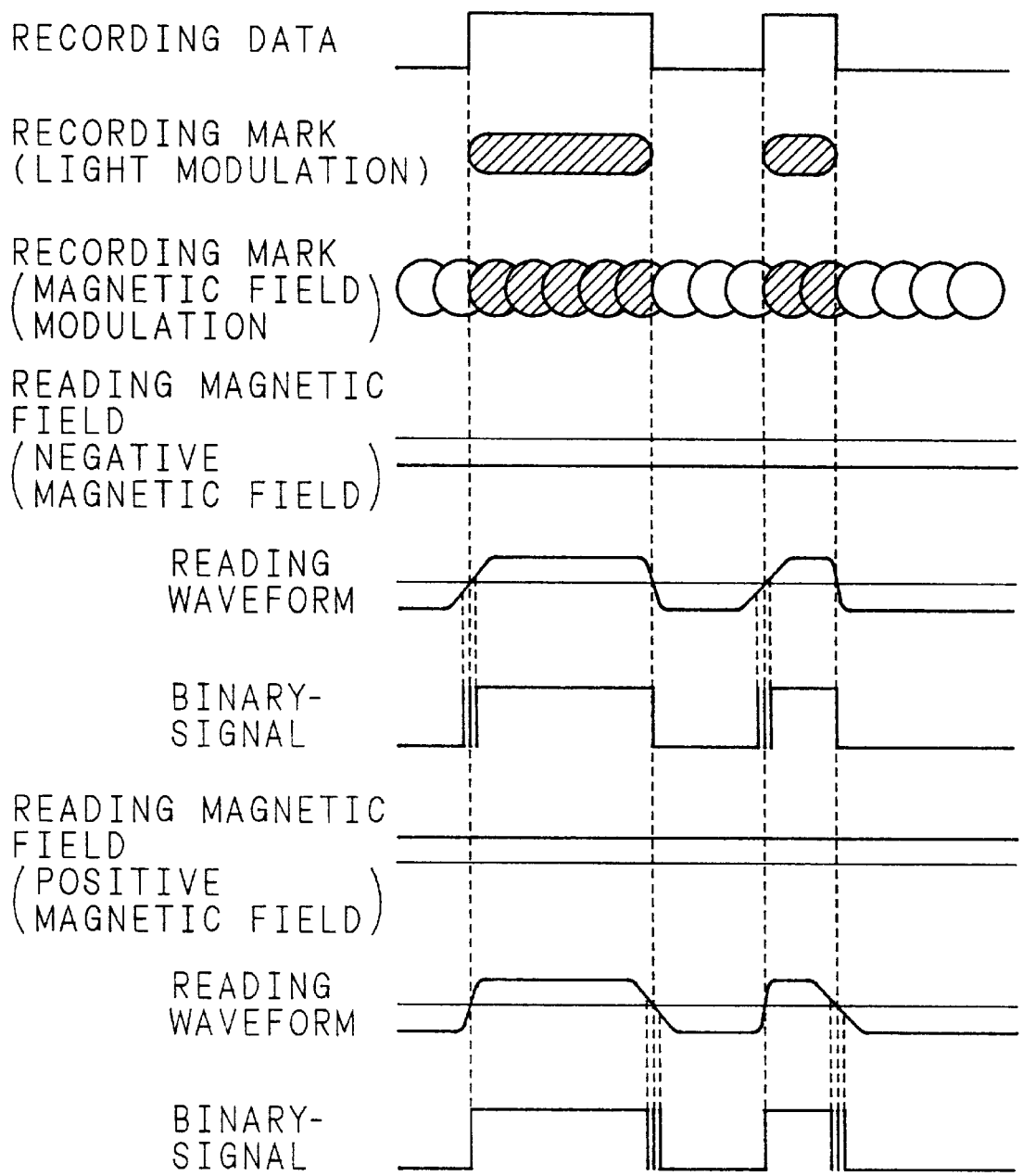
FIG. 2 is an illustration for explaining the direction and reading waveform of a reading magnetic field of an MSR medium proposed by the applicant of the present invention.
Figure 3:
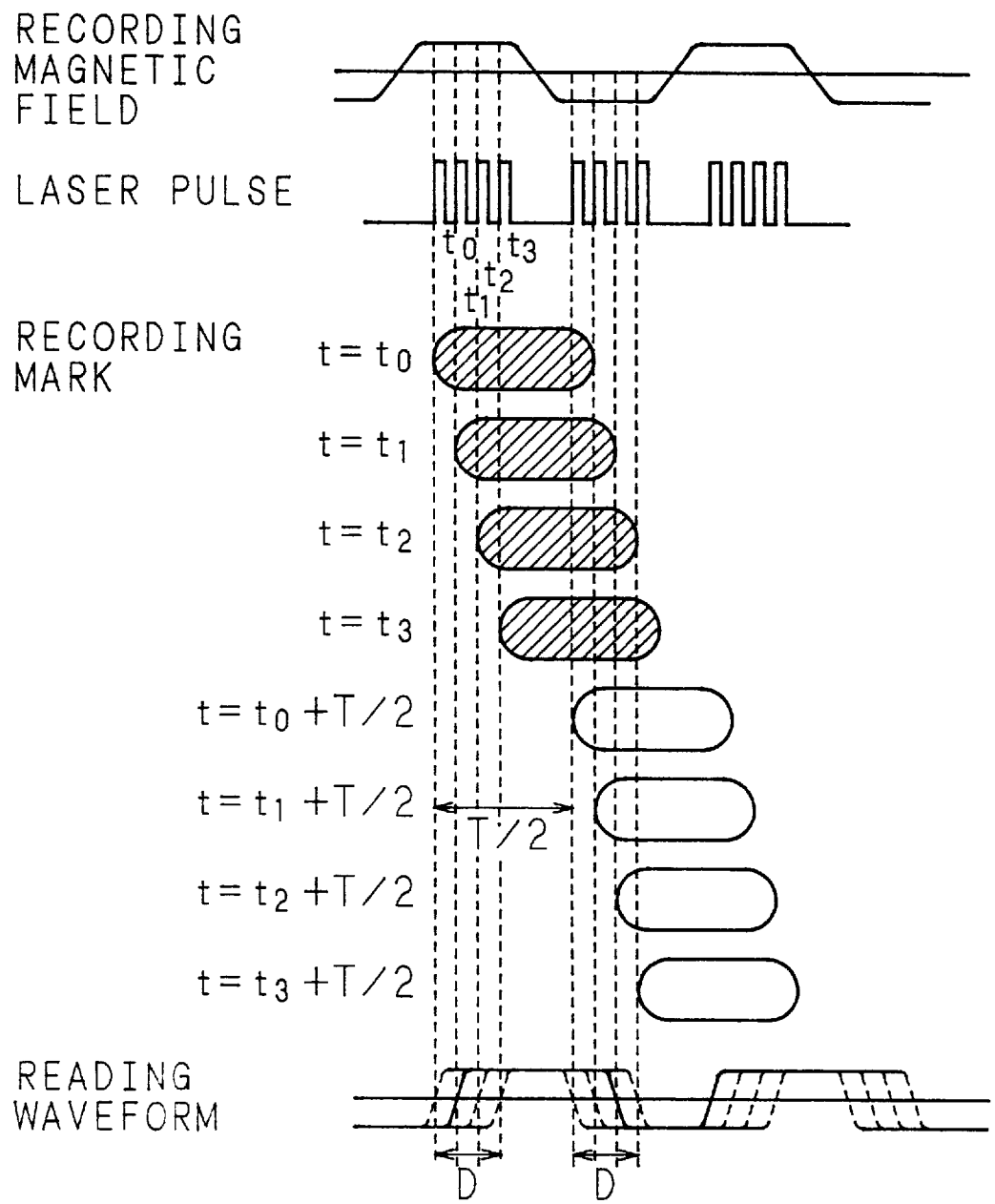
FIG. 3 is an illustration for explaining a recording-mark forming position and reading waveform according to a generally-known recording method.

First, the theory of a reading method of the present invention is described below by using a recording mark formed on a magneto-optical recording medium to be read by a method of the present invention. FIG. 3 is an illustration showing a recording mark formed by a generally-known recording method and its reading waveform. In the case of a magneto-optical recording medium in which data is recorded by the generally-known recording method, a range capable of forming the front and rear edges of a recording mark is determined. A reading method of the present invention is applied to a magneto-optical recording medium in which data is recorded by the generally-known recording method.

For recording, a recording magnetic field to be reversed every cycle of T/2 is applied to a magneto-optical recording medium and a laser pulse with a predetermined power is emitted when applying a positive magnetic field and a negative magnetic field once each. The laser-pulse emission timing "t" is determined in accordance with data to be recorded. FIG. 3 shows a case in which any one of four timing points t0, t1, t2, and t3 is determined. When emitting a laser pulse while the recording magnetic field is positive, recording marks in the recording direction are formed and hatched in FIG. 3. However, when emitting a laser pulse while the recording magnetic field is negative, recording marks in the erasing direction are formed.

By setting the laser-pulse emission timing "t" is set to t0 when the recording magnetic field is positive, the position of the front edge of a recording mark (recording direction) formed at t=t1, t=t2, or t=t3 is formed at a position shifted by a predetermined distance from a reference position when assuming the position of the front edge of a recording mark formed at t=t0 as the reference position. Moreover, when the recording magnetic field is reversed to a negative magnetic field and a laser pulse is emitted at a timing of t=t0+T/2, t=t1+T/2, t=t2+T/2, or t=t3+T/2, a recording mark (erasing direction) is formed at a position shifted from the reference position by a predetermined distance while it is overwritten on the recording mark of the recording direction. The front edge of the recording mark serves as the rear edge of the recording mark of the recording direction.

Thus, the laser-pulse emission timing is made to differ corresponding to data to be recorded and the positions of the front and rear edges of a recording mark are formed at positions shifted from a reference position. This recording method is disclosed in the Japanese Patent Application Laid-Open No. 6-76399 (1994).

In the case of the waveform of a reading signal of a magneto-optical recording medium in which data is recorded, both the front and rear edges are present in the range of a period D independently of the shift amount of a recording mark as shown in FIG. 3. Thus, because the front and rear edges of a recording mark are formed without fail in the applying periods of positive and negative recording magnetic fields, the polarity of a reading magnetic field is reversed and applied at the same timing as that of the reversal cycle of a recording magnetic field by detecting the reversal timing of the polarity of the recording magnetic field applied for recording, that is, obtaining a reference clock. Thereby, it is possible to apply a reading magnetic field with a polarity capable of making the inclination of the edge of a reading waveform steep at the front and rear edges of a recording mark and obtain a reading waveform having linearity.

Then, the present invention is specifically described below by referring to the accompanying drawings showing the embodiments of the present invention.

Figure 4:
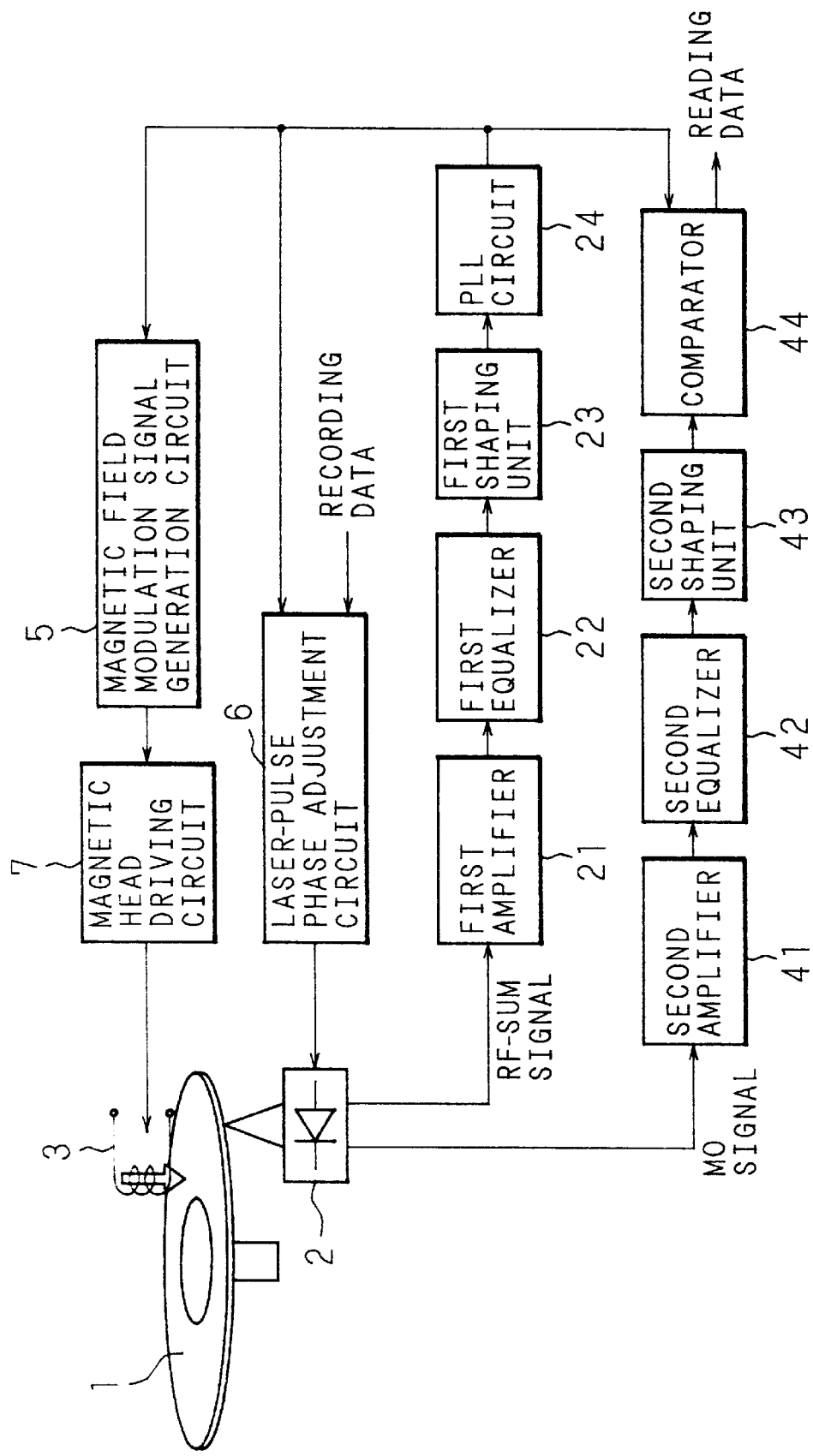
FIG. 4 is a block diagram showing the structure of a recording and reading apparatus of the present invention.
Figure 5:
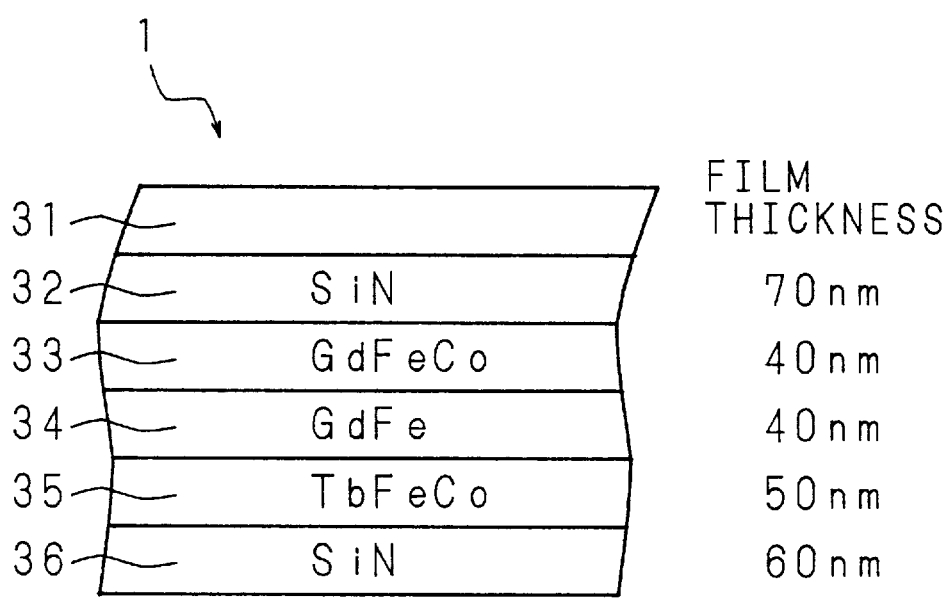
FIG. 5 is a block diagram showing the structure of a film of a magneto-optical disk used to embody the present invention.

FIG. 4 is a block diagram showing the structure of a recording and reading apparatus of the present invention. In FIG. 4, symbol 1 denotes a magneto-optical disk which is set so as to be rotatable in the circumferential direction. FIG. 5 is a block diagram showing the structure of a film of the magneto-optical disk 1. The magneto-optical disk 1 is constituted by superposing a bed layer 32 made of SiN with a thickness of 70 nm, a reading layer 33 serving as a first magnetic layer made of GdFeCo with a thickness of 40 nm, an intermediate layer 34 serving as a second magnetic layer made of GdFe with a thickness of 40 nm, a recording layer 35 serving as a third magnetic layer made of TbFeCo with a thickness of 50 nm, and a protective layer 36 made of SiN with a thickness of 60 nm on a substrate 31 made of photopolymer glass (2P glass) in order. These magnetic layers are superposed by the magnetron sputtering method.

The reading layer 33 is a transition-metal magnetization dominant film and has a magnetization easy axis in the perpendicular direction to the disk 1 or superposing direction. The intermediate layer 34 is a rare-earth magnetization dominant film and has a magnetization easy axis in the in-plane direction at room temperature. At a predetermined temperature higher than room temperature, the direction of the magnetization easy axis changes from the in-plane direction to the perpendicular direction. The recording layer 35 is a transition-metal magnetization dominant film and has a magnetization easy axis in the perpendicular direction. Moreover, when setting the Curie temperatures of the reading layer 33, intermediate layer 34, and recording layer 35 to Tc1, Tc2, and Tc3 respectively, the inequalities of Tc2<Tc1 and Tc2<Tc3 are satisfied. Furthermore, when setting the coercive forces of the reading layer 33 and recording layer 35 at room temperature to Hc1 and Hc3 respectively, the inequality of Hc3>Hc1 is satisfied. The structure of the film of the magneto-optical disk 1 is the same as that of the MSR medium disclosed by the applicant of the present invention in the Japanese Patent Application Laid-Open No. 7-244877 (1995) and the description of other structures and fabrication process is omitted.

The magneto-optical disk 1 having the above structure has a laser beam source for emitting a laser beam at its lower side where an optical head 2 for condensing reflected light and detecting a reading signal is provided and a magnetic head 3 for applying a magnetic field is provided at its upper side as shown in FIG. 4. In the case of the magneto-optical disk 1, prepit information is recorded by irregular pits, the RF-SUM signal of the prepit information read by the optical head 2 is input to and amplified by a first amplifier 21, then input to a first equalizer 22, a first shaping unit 23, and a PLL (phase locked loop) circuit 24 and successively signal-processed, and a reference clock is output from the PLL circuit 24.

The reference clock is input to a laser-pulse phase adjustment circuit 6 together with recorded data, and a pulse signal whose phase is adjusted so that a laser pulse corresponding to data to be recorded is output is supplied to the optical head 2 from the laser-pulse phase adjustment circuit 6. Moreover, the reference clock is input to a magnetic field modulation signal generation circuit 5, the magnetic field modulation signal generation circuit 5 generates a magnetic field modulation signal for modulating a recording magnetic field and a reading magnetic field on the basis of the reference clock and outputs the signal to a magnetic head driving circuit 7. The magnetic head driving circuit 7 drives the magnetic head 3 on the basis of the input magnetic field modulation signal.

Moreover, an MO signal obtained by reading a recording mark by the optical head 2 is input to and amplified by a second amplifier 41, input to a second equalizer 42 and second shaping unit 43 and successively signal-processed, and output to a comparator 44. The comparator 44 receives the reference clock from the PLL circuit 24 to generate a sawtooth-wave signal and compares the MO signal with the sawtooth-wave signal. According to a comparison result, reading data is output.

Figure 6:
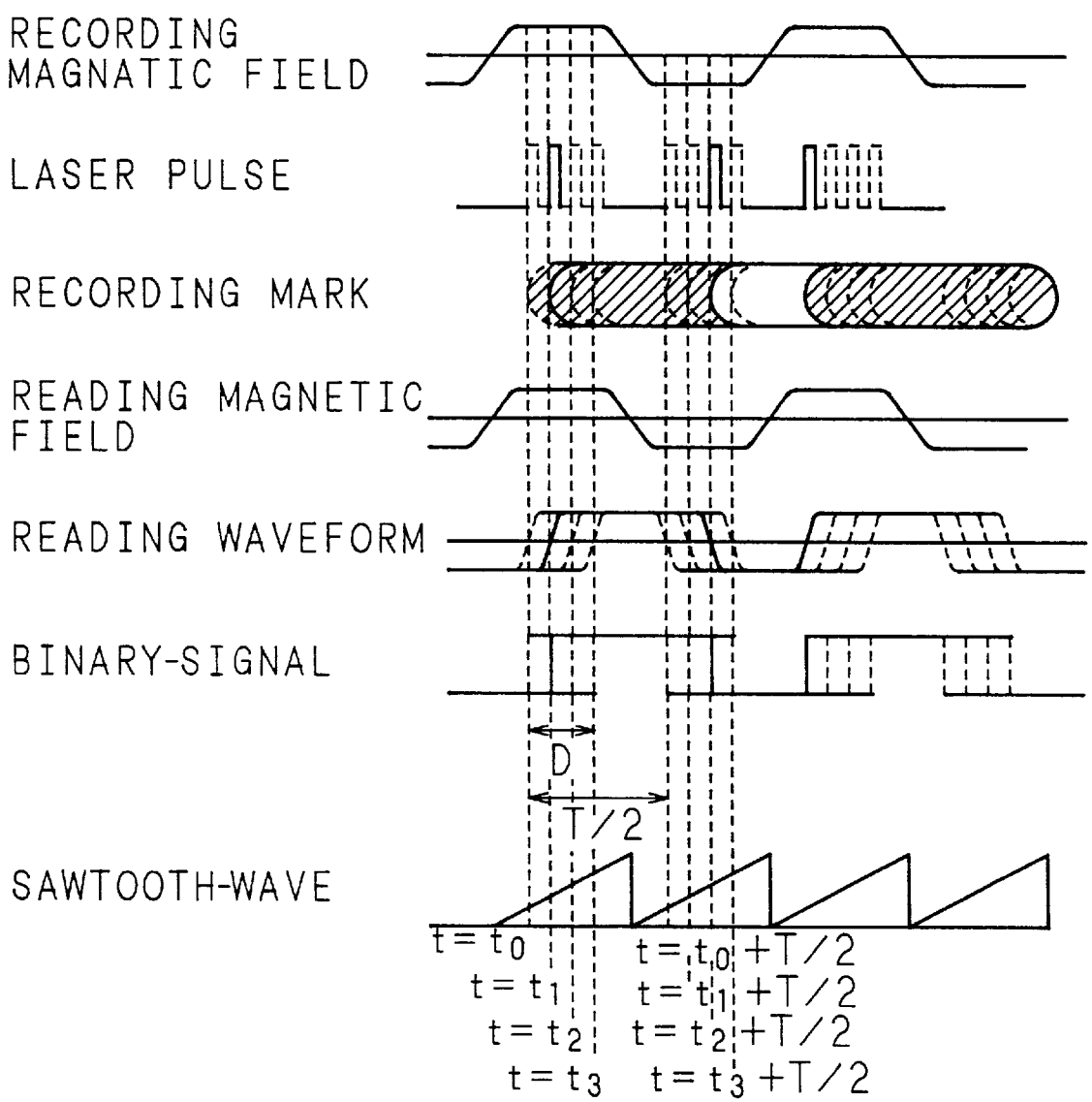
FIG. 6 is a timing chart for explaining the recording and reading operations of the present invention.

A procedure for recording data in a magneto-optical recording medium and reading the data by the above apparatus is described below. FIG. 6 is a timing chart for explaining the recording and reading operations. First, the magneto-optical disk 1 is set to a recording and reading apparatus and prepit information is reading by the optical head 2 to obtain a reference clock from a RF-SUM signal. The magnetic field modulation signal generation circuit 5 generates a magnetic field modulation signal on the basis of the reference clock and applies a recording magnetic field to be reversed from positive to negative states or negative to positive states on a cycle of T/2 to the magneto-optical disk 1. A laser beam is emitted from a laser beam source provided for the optical head 2 at any one of timings according to data among four levels of laser pulse emission timings and a recording mark is formed.

The laser pulse emission timing is adjusted at four timing points of t=t0, t=t1, t=t2, and t=t3 for a positive magnetic field and of t=t0+T/2, t=t1+T/2, t=t2+T/2, and t=t3+T/2 for a negative magnetic field on the basis of t=t0. In the case of this embodiment, a case is described in which a laser pulse is emitted at the timing of t=t1 when a recording magnetic field is a positive magnetic field, at the timing of t=t2+T/2 when the recording magnetic field is reversed to a negative magnetic field, and at the timing of t=t0 for the next positive magnetic field. However, the case is not restricted to the above case or the emission timing is not restricted to four points.

In the case of a recording mark thus formed, the position of the front edge of a recording mark (recording direction) formed at a laser-pulse emission timing of t=t1, t=t2, or t=t3 is shifted from a reference position by a predetermined distance when assuming the position of the front edge of a recording mark formed at a laser-pulse emission timing of t=t0 as the reference position. Moreover, when a recording magnetic field is a negative magnetic field, the position of the front edges of a recording mark (erasing direction) formed at a laser-pulse emission timing of t=t0+T/2, t=t1+T/2, t=t2+T/2, or t=t3+T/2 is shifted from the reference position by a predetermined length. In this case, the front edge of the recording mark of the erasing direction serves as the rear edge of the recording mark of the recording direction.

Moreover, when reading the recording mark, the prepit information in the magneto-optical disk 1 is read by the optical head 2 to obtain the reference clock from the RF-SUM signal. The magnetic field modulation signal generation circuit 5 generates a magnetic field modulation signal on the basis of the reference clock and applies a reading magnetic field to be reversed from positive to negative states or negative to positive states on a cycle of T/2 to the magneto-optical disk 1. In this case, because the reading magnetic field is modulated on the basis of the reference clock, the magnetic field is reversed at the same timing and in the same direction as the recording magnetic field applied for recording. That is, a positive magnetic field is applied at the front edge of a reading waveform and a negative magnetic field is applied at the rear edge of the waveform without fail. A reading laser beam is emitted by the optical head 2 while a reading magnetic field is applied and an MO signal is detected, signal-processed, and a binary signal is obtained. In the comparator 44, a sawtooth-wave signal is generated on the basis of the reference clock, the obtained binary signal and sawtooth-wave signal are compared with each other, and resultingly a shift amount from the reference position is computed and reading data is output.

Thus, the front edge of a recording mark, that is, the front edge of a reading waveform is formed without fail in the period of applying a positive recording magnetic field and the rear edge of the mark is formed without fail in the period of applying a negative recording magnetic field. Thereby, by applying a reading magnetic field to be reversed on the same cycle and in the same direction as the recording magnetic field, it is possible to apply a positive magnetic field when reading a front edge and a negative magnetic field when reading a rear edge without considering the time required for the delay and magnetic field reversal of a signal processing circuit and obtain a reading waveform whose front edge has linearity.

In the case of the above reading method, an edge of a reading signal may be detected at a position not present in recorded data when the intensity of the reading magnetic field comes to zero. However, because a recording mark read by the present invention does not have any edge when a reading magnetic field comes to zero, it is possible to remove an edge read in the above range because the edge is unrelated to data.

Moreover, in the case of the above embodiment, a magneto-optical disk having a film structure in which the front edge of a reading waveform becomes steep when a reading magnetic field is a positive magnetic field and the rear edge of the waveform becomes steep when the reading magnetic field is a negative magnetic field is described as an example. However, the present invention is not restricted to the embodiment. For example, when applying the present invention to a magneto-optical disk having a film structure in which the rear edge of a reading waveform becomes steep when a reading magnetic field is a positive magnetic field and the front edge of the waveform becomes steep when the reading magnetic field is a negative magnetic field, it is possible to apply a reading magnetic field with a polarity opposite to that of a recording magnetic field as shown below and obtain a reading waveform whose front and rear edges have linearity.

Figure 7:
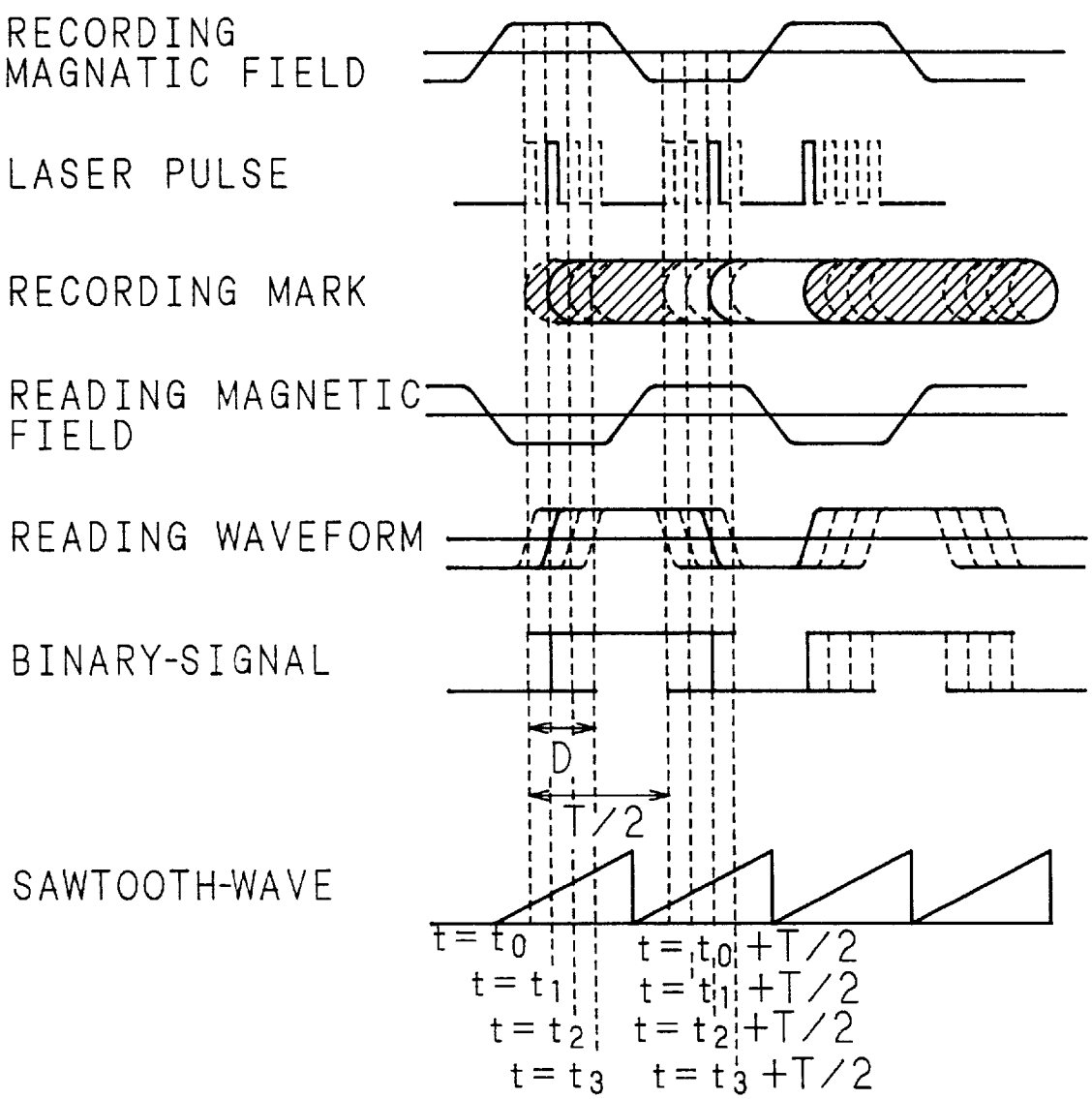
FIG. 7 is a timing chart for explaining other recording and reading operations of the present invention.

FIG. 7 is a timing chart for explaining the recording and reading operations when applying a reading magnetic field with a polarity opposite to that of a recording magnetic field. The recording operation is performed similarly to the above-described procedure. For reading, the prepit information in the magneto-optical disk 1 is read by the optical head 2 to obtain a reference clock from an RF-SUM signal. The magnetic field modulation signal generation circuit 5 generates a magnetic field modulation signal on the basis of a reversed reference clock whose polarity is reversed and applies a reading magnetic field to be reversed at every cycle of T to the magneto-optical disk 1. In this case, because the reading magnetic field is modulated on the basis of the reversed reference clock, the reading magnetic field is reversed at the same timing as that of recording magnetic field applied for recording. That is, a negative magnetic field is applied at the front edge of a reading waveform and a positive magnetic field is applied at the rear edge of the waveform without fail. The signal processing performed until read data is output after an MO signal is obtained is the same as the case of the above embodiment, and the description is omitted.

Moreover, the magneto-optical recording and reading apparatus of this embodiment shown in FIG. 4 has a recording function and a reading function. However, the present invention is not restricted to the embodiment. It is also possible to use a magneto-optical reading apparatus having only a reading function. A magneto-optical recording medium in which recording marks whose shift amounts from a reference position differ in accordance with data is set to a magneto-optical reading apparatus and a reference clock is detected by reading prepit information to generate a magnetism modulation signal. By emitting a reading light beam while applying a reading magnetic field for reversing a polarity at the same timing as that of a recording magnetic field applied for recording on the basis of the magnetism modulation signal, it is possible to obtain a reading signal which has a small jitter and whose front and rear edges have linearity.

As described above, in the case of the present invention, a magnetic field with a desired polarity, that is, a polarity by which an edge of a reading waveform becomes steep is applied to the front and rear edges of a recording mark when reading a magneto-optical recording medium in which the present range of the front and rear edges of the recording mark are previously determined. Therefore, the inclinations of the both edges become closer to being symmetric and it is possible to obtain a high-quality reading signal with small jitters of the both edges. Moreover, it is possible to make the front and rear edges of a reading waveform of an MSR medium with steep read-waveform edges closer to being symmetric compared to the case of a normal magneto-optical recording medium on which recording marks with a diameter almost equal to a beam spot are formed. Therefore, the present invention has superior advantages including the fact that a high-density recording medium having a preferable reading characteristic is obtained.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. A magneto-optical reading method for reading data in a magneto-optical recording medium wherein recording marks having shift amounts from a predetermined position differ in accordance with data to be recorded are formed on the magneto-optical recording medium by irradiating a light beam while applying a recording magnetic field whose polarity is reversed on a predetermined cycle, the method comprising the steps of:

detecting the reversal cycle of the recording magnetic field;

applying a reading magnetic field in which the timing of reverse between first and second polarities synchronizes with the timing of reverse of the recording magnetic field to the magneto-optical recording medium so that the reverse of polarities occurs in the same cycle as that of the recording magnetic field; and detecting magneto-optical reading signal of the recording marks to read data.

2. The magneto-optical reading method according to claim 1, wherein the step of applying a reading magnetic field includes:

the step of applying a first-polarity reading magnetic field when reading the recording marks formed by applying the first polarity of the recording magnetic field; and the step of applying a second-polarity reading magnetic field when reading the recording marks formed by applying the second polarity of the recording magnetic field.

3. The magneto-optical reading method according to claim 1, wherein the step of applying a reading magnetic field includes:

the step of applying a second-polarity reading magnetic field when reading the recording marks formed by applying the first polarity of the recording magnetic field; and the step of applying a first-polarity reading magnetic field when reading the recording marks formed by applying the second polarity of the recording magnetic field.

4. A magneto-optical reading method for reading data in a magneto-optical recording medium wherein recording marks having the front edge and the rear edge correspond to first-polarity and second-polarity recording magnetic fields respectively and making distances up to the respective front edge and the rear edge from a predetermined position differ in accordance with data to be recorded are formed on the magneto-optical recording medium by irradiating a light beam while applying a recording magnetic field whose polarity is reversed at a predetermined cycle, the method comprising the steps of:

applying a reading magnetic field of different polarities according to the front edge and the rear edge of the recording marks to the magneto-optical recording medium; and detecting magneto-optical reading signal of the recording marks to read the data.

5. The magneto-optical reading method according to claim 4, wherein the step of applying a reading magnetic field includes:

the step of applying a first-polarity reading magnetic field when reading the recording marks formed by applying the first polarity of the recording magnetic field; and the step of applying a second-polarity reading magnetic field when reading the recording marks formed by applying the second polarity of the recording magnetic field.

6. The magneto-optical reading method according to claim 4, wherein the step of applying a reading magnetic field includes:

the step of applying a second-polarity reading magnetic field when reading the recording marks formed by applying the first polarity of the recording magnetic field; and the step of applying a first-polarity reading magnetic field when reading the recording marks formed by applying the second polarity of the recording magnetic field.

7. A magneto-optical reading apparatus for reading data in a magneto-optical recording medium on which recording marks whose shift amounts from a predetermined position differ in accordance with the data to be recorded are formed, the apparatus comprising:

an optical head for emitting a light beam to obtain reading signals of a prepit and the recording marks on the magneto-optical recording medium;

a circuit for generating a reference clock from the reading signal of the prepit;

a circuit for generating a magnetic field modulation signal for revering the polarity of a reading magnetic field on the basis of the reference clock;

a magnetic head for applying the reading magnetic field to the magneto-optical recording medium; and a circuit for comparing the reading signal of the recording marks with a predetermined sawtooth-wave signal, detecting the shift amounts of the recording marks by a comparison result, and reading the data.

8. A magneto-optical recording and reading apparatus for recording the recording marks whose shift amounts from a predetermined position differ in accordance with the data to be recorded in a magneto-optical recording medium and reading the data in the magneto-optical recording medium, the apparatus comprising:

an optical head for emitting a light beam to obtain reading signals of a prepit and the recording marks on the magneto-optical recording medium;

a circuit for generating a reference clock from the reading signal of the prepit;

a circuit for generating a magnetic field modulation signal for reversing the polarities of a recording magnetic field and a reading magnetic field on the basis of the reference clock;

a circuit for indicating the phase of a light beam to the optical head in accordance with data to be recorded for recording; and a circuit for comparing the reading signal of the recording marks obtained from the optical head with a predetermined sawtooth-wave signal, detecting the shift amounts of the recording marks by a comparison result, to read the data, for reading.

9. A magneto-optical recording medium comprising:

a substrate; and a magnetic layer which is located on the substrate and constituted by superposing magnetically coupled first magnetic layer, second magnetic layer, and third magnetic layer in order, wherein the magnetic layer includes a temperature distribution region in which a temperature distribution is produced by emitting a light beam moving relatively to the magneto-optical recording medium, the temperature distribution region having recording marks, in a region specified due to temperature, whose shift amounts from a predetermined position differ in accordance with data to be recorded, and which are formed by irradiating a light beam at different timings while applying a recording magnetic field with a polarity reversed on a predetermined cycle.

* * * * *

UNITED STATES PATENT AND TRADEMARK OFFICE
CERTIFICATE OF CORRECTION

PATENT NO. : 5,883,863
DATED : March 16, 1999
INVENTOR(S) : Itakura et al.

It is certified that error appears in the above-identified patent and that said Letters Patent is hereby corrected as shown below:

On the title page, items:

"[57] Abstract", line 4 after

"symmetric" insert --. This is accomplished--

"[57] Abstract", line 8 after

"recording" insert --.--

"[57] Abstract", line 8 delete

"because" and insert --Because-- therefor

UNITED STATES PATENT AND TRADEMARK OFFICE
CERTIFICATE OF CORRECTION

| | |
|---|---|
| PATENT NO. : | 5,883,863 |
| DATED : | March 16, 1999 |
| INVENTOR(S) : | Itakura et al. |

It is certified that error appears in the above-identified patent and that said Letters Patent is hereby corrected as shown below:

"[57] Abstract", line 9" delete

"determined." and insert --determined, the result is a more symmetric read.-- therefor Column 1, line 9, delete "an" and after "apparatus" insert --,-- therefor Column 1, line 14, delete "requested" and insert --desired-- therefor Column 2, line 8, delete "focussing" and insert --focusing-- therefor Column 2, line 44, delete "or higher"

UNITED STATES PATENT AND TRADEMARK OFFICE
CERTIFICATE OF CORRECTION

PATENT NO. : 5,883,863
DATED : March 16, 1999
INVENTOR(S) : Itakura et al.

It is certified that error appears in the above-identified patent and that said Letters Patent is hereby corrected as shown below:

Column 4, line 26, delete "either-side" and insert --either side-- therefor

Column 4, line 41, after "making" delete "the"

Column 6, line 11, after "data," insert --and-- therefor

Column 7, line 24, delete "is set"

Column 8, line 52, after "signal" insert --,--

Column 8, line 54, after "output" insert --,--

UNITED STATES PATENT AND TRADEMARK OFFICE
CERTIFICATE OF CORRECTION

PATENT NO. : 5,883,863
DATED : March 16, 1999
INVENTOR(S) : Itakura et al.

It is certified that error appears in the above-identified patent and that said Letters Patent is hereby corrected as shown below:

Column 9, line 12, delete "is reading" and insert --is read-- therefor

Column 12, line 64, delete "revering" and insert --reversing-- therefor

Signed and Sealed this

Twenty-fifth Day of January, 2000

Attest:

Attesting Officer

Acting Commissioner of Patents and Trademarks